Feb. 6, 1968   D. H. P. BAKER   3,367,431
SURGICAL SPONGE COLLECTOR WITH MEANS FOR
COUNTING AND WEIGHING SPONGES
Filed Dec. 16, 1965

INVENTOR
DOROTHY H. PRINDLE BAKER

BY Cullen, Sloman & Cantor

ATTORNEYS

United States Patent Office 3,367,431
Patented Feb. 6, 1968

3,367,431
SURGICAL SPONGE COLLECTOR WITH MEANS
FOR COUNTING AND WEIGHING SPONGES
Dorothy H. Prindle Baker, 13631 Northend St.,
Oak Park, Mich. 48237
Filed Dec. 16, 1965, Ser. No. 514,328
1 Claim. (Cl. 177—15)

ABSTRACT OF THE DISCLOSURE

A counting and weighing collector for surgical sponges which includes a cabinet with receiver slot, a counter on the cabinet, a light source in the cabinet projecting a beam across the underside of the slot, a signal producing light responsive device in the cabinet in registry with the source interupted by the passage of a sponge through the slot, and a counter actuating means interconnecting the counter and light responsive device, together with a weighing scale in the cabinet mounting a basket below the slot, and a weight indicator on the cabinet connected to the scale to provide a continuous and visible indication of the number of sponges and the total weight thereof, deposited within said collector.

---

This invention relates to a device for counting and weighing soiled surgical sponges in the operating room.

In the past, disposal of soiled surgical sponges after their removal from the body of a patient being operated upon has been accomplished by simply throwing the sponges into a container on the operating room floor. In order to obtain an accurate sponge count to insure that none have been left in the body of the patient, these sponges must then be collected and counted. Since it is often desirable to determine the weight of blood lost by the patient during surgery, the soiled sponges may also be placed on a scale for weighing.

The collecting, counting and weighing of soiled sponges thus entails several operations. The initial throwing of the sponges into the container and the subsequent handling of the sponges for counting and weighing frequently results in soiled sponges landing on the floor of the operating room and thereby contaminating the area.

Accordingly, it is an object of this invention to provide a compact self-contained collector for soiled surgical sponges which provides a continuous reading of the number and weight of the deposited soiled sponges.

This and other objects of this invention will become apparent from the following description, when considered in conjunction with the accompanying drawings.

Figure 1:
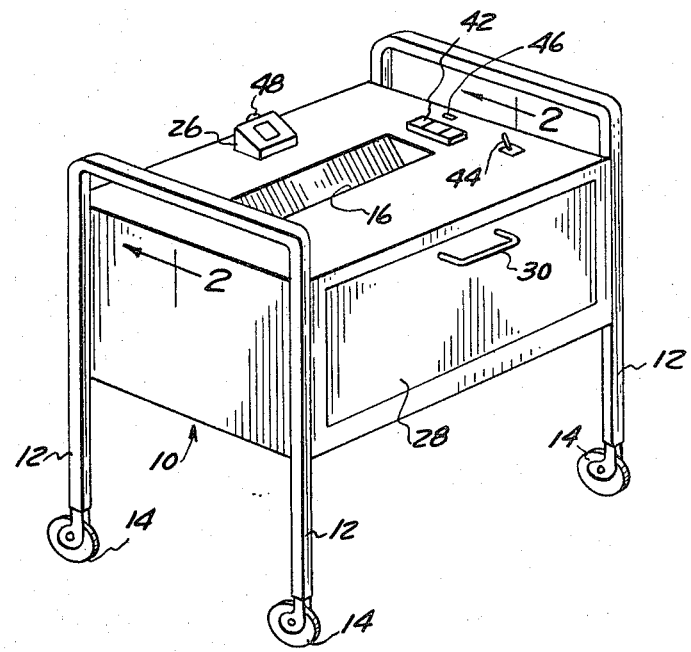
FIG. 1 is a perspective view of the sponge collector of this invention.

Referring now to the drawings, the sponge collector comprises a cabinet portion 10 supported on a plurality of legs 12. The legs are provided with casters 14 so that the collector can be conveniently and easily wheeled about the operating room as desired.

Figure 2:
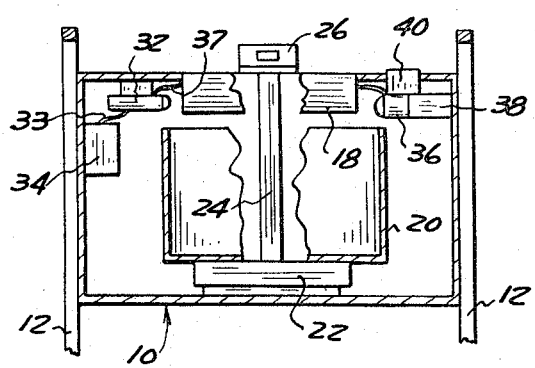
FIG. 2 is a partially fragmented cross-sectional elevation taken along line 2—2 of FIG. 1.

A slot 16 is provided in the top face of cabinet 10, one edge of the slot having a baffle 18 downwardly inclined therefrom. The interior of the cabinet, as shown in FIG. 2, contains a basket 20 supported on a scale 22 which is connected through appropriate linkage 24 (portions of basket 20 and baffle 18 being fragmented to reveal the linkage) to a scale indicator dial 26 on the exterior of the top of the cabinet. The linkage 24 is of conventional design and does not form a part of this invention, and is accordingly shown in simplified form. The front face of the cabinet 10 is provided with an access door 28 hinged at its lower end and having a handle 30. The top face of the cabinet may be provided with a transparent plastic window if desired.

Referring once again to FIG. 2, a lamp 32 is secured to the interior of the cabinet and connected through appropriate wiring 33 to rechargeable battery 34 similarly secured to the interior of the cabinet. Lamp 32 is so placed on the interior of the cabinet that the light beam created by it shines along the underside of the length of slot 16, so that any sponge falling through the slot will interrupt the light beam.

Mounted on the opposite side of slot 16 from lamp 32 and directly in the path of the light beam from lamp 32 is a photocell 36. This photocell is connected by appropriate wiring 37 to battery 34.

Adjacent photocell 36 is a solenoid 38 which is connected by appropriate wiring (not illustrated) to the photocell so as to be actuated upon a signal from the photocell. The plunger of solenoid 38 is connected to counter 40, which has an indicator portion 42 visible on the exterior of cabinet 10. The particular construction of photocell 36, solenoid 38 and counter 40 do not form a part of this invention. A conventional installation which may be employed is found in United States Patent No. 2,470,926.

The collector may be provided with an on/off switch 44 for turning on the lamp-photocell-solenoid circuit. A reset device 46 permits counter 40 to be set to zero when desired. Similarly, a zeroing adjustment 48 for scale 22 is provided at scale indicator 26.

In operation, the collector is wheeled up alongside of an operating table and the soiled blood-soaked sponges are deposited through slot 16 into basket 20 as they are removed from the patient. As the sponges drop through slot 16 they interrupt the light beam passing from lamp 32 to photocell 36. The interruption of this light beam activates the photocell which sends an appropriate signal to actuate solenoid 38 to advance counter 40 one digit. In this way the counter registers the number of sponges which have been deposited in the collector.

To provide a continuous indication of the weight of the deposited sponges, scale 22 is zeroed by zeroing device 48 with an empty basket 20 positioned on the scale. As the blood-soaked sponges are deposited in the collector, the total weight of the sponges is registered by indicator 26. By knowing the dry weight of the various size sponges utilized during the operation, the weight of blood absorbed by the sponges can be readily obtained by subtraction. When the operation is over, or when basket 20 becomes filled with soiled sponges, it may be removed through access door 28.

This invention thus provides a compact, convenient and antiseptic means for collecting soiled surgical sponges, while simultaneously providing a continuous indication of the weight and count of soiled sponges deposited therein.

This invention may be further developed within the scope of the following claim. Accordingly, the above description is to be interpreted as illustrative of only a single operative embodiment of the invention, and not in a strictly limited sense.

I now claim:

1. A surgical sponge collector comprising:
    a cabinet type enclosure having a sponge receiving slot in its upper face;
    an electric battery secured to the interior of said cabinet;
    a light source secured to the interior of said cabinet adjacent one end of said slot and so disposed as to throw a beam of light across the underside of said slot;
    a signal producing light responsive device secured to the interior of said cabinet adjacent the other end of said slot and so disposed as to be in the path of a light beam emanating from said light source;

a counter mechanism secured to said cabinet adjacent said light responsive device;

counter actuating means operatively connected to said counter and to said light responsive means for advancing said counter one digit upon receipt of a signal from said light responsive means;

whereby said counter registers the number of sponges deposited in the collector in response to the interruption of the light beam falling upon said light responsive device whenever a sponge falls through said slot, a weighing scale mounted within said collector; a sponge receiving basket positioned upon said scale and directly beneath said slot; and a weight indicator dial on the exterior surface of said collector and operatively connected to said scale; whereby the sponge collector provides a continuous indication of the weight of the sponges deposited therein.

References Cited
UNITED STATES PATENTS

| | | | |
|---|---|---|---|
| 2,069,499 | 2/1937 | Marin et al. | 177—132 X |
| 2,263,383 | 11/1941 | Griffith | 177—245 |
| 2,470,926 | 5/1949 | Gieseke | 235—98.5 |
| 2,516,443 | 7/1950 | Wylde | 235—98 X |
| 2,560,945 | 7/1951 | Goldberger | 177—144 X |
| 3,040,980 | 6/1962 | Mann et al. | 235—98.5 |
| 3,146,944 | 9/1964 | Grippi | 235—98.5 |

ROBERT S. WARD, Jr., *Primary Examiner.*